United States Patent [19]

Kondo

[11] Patent Number: 4,984,894

[45] Date of Patent: Jan. 15, 1991

[54] METHOD OF AND APPARATUS FOR MEASURING FILM THICKNESS

[75] Inventor: Noriyuki Kondo, Kyoto, Japan

[73] Assignee: Dainippon Screen Mfg. Co., Ltd., Japan

[21] Appl. No.: 394,650

[22] Filed: Aug. 16, 1989

[30] Foreign Application Priority Data

Aug. 17, 1988 [JP] Japan ................... 63-203997

[51] Int. Cl.⁵ .................. G01B 11/06; G01B 11/02
[52] U.S. Cl. .................. 356/382; 356/381; 356/355; 356/357
[58] Field of Search .................. 356/381–382, 356/355, 332, 357, 51

[56] References Cited

U.S. PATENT DOCUMENTS

| | | | |
|---|---|---|---|
| 4,352,561 | 10/1982 | Tohyama et al. | 356/332 |
| 4,555,767 | 11/1985 | Case et al. | 356/381 |
| 4,618,262 | 10/1986 | Maydan et al. | 356/357 |
| 4,645,349 | 2/1987 | Tabata | 356/382 |
| 4,676,647 | 6/1987 | Kikkawa et al. | 356/382 |

FOREIGN PATENT DOCUMENTS 60231125  5/1984  Japan .

OTHER PUBLICATIONS

IBM Technical Disclosure Bulletin, vol. 20, No. 3, "Optical Thickness Measurement Analysis Applicable to Multilayer Films", Aug. 1979.

Primary Examiner—Richard A. Rosenberger
Assistant Examiner—Hoa Pham
Attorney, Agent, or Firm—Ostrolenk, Faber, Gerb & Soffen

[57] ABSTRACT

A method of and an apparatus for measuring the thickness of a first thin film which is the uppermost layer of a sample formed by two or more stacked thin films. Light is transmitted through the first thin film but absorbed by a second thin film positioned directly under the first thin film. The spectrum of light reflected by the sample is detected to obtain the thickness of the first thin film.

15 Claims, 5 Drawing Sheets

METHOD OF AND APPARATUS FOR MEASURING FILM THICKNESS

BACKGROUND OF THE INVENTION

1. Field of the Invention

The present invention relates to a method of and an apparatus for measuring film thickness. In particular, the present invention relates to a method of and an apparatus for measuring the thickness of a thin film which is an uppermost layer of a sample having two or more stacked thin films.

2. Description of the Prior Art

In general, interferometry is widely used to measure the thickness of a transparent thin film such as a silicon oxide film formed on a silicon substrate. The technique is used in a non-contact manner in an inspection step of a semiconductor fabricating process or the like.

To measure the thickness of the transparent thin film, visible light is applied to the sample and the spectrum of light reflected by the sample is detected.

FIGS. 1A to 1C illustrate three general types of waveforms representing spectra of light reflected by samples having a transparent thin film to be measured when the samples are irradiated with visible light. The thickness of the transparent thin film is determined according to the type of spectral data actually detected, as follows:

(1) First Type

FIG. 1A illustrates a waveform which is characteristic of spectral data obtained when the thickness of the thin film to be measured is relatively large. As shown in FIG. 1A, the waveform includes a plurality of extreme values. When such spectral data is measured, two appropriate extreme values (wavelengths $\lambda_A$ and $\lambda_B$, for example) are used to calculate the thickness of the thin film. The thickness is calculated on the basis of the difference ($\lambda_B - \lambda_A$) between the selected extreme values.

(2) Second Type

A waveform with an increased cycle is obtained as the thickness of the transparent thin film to be measured is reduced. When the thickness of the thin film is relatively small, a waveform with only one extreme value (wavelength $\lambda_C$) is detected (FIG. 1B). There is a correlation between the extreme value (wavelength $\lambda_C$) and the thickness of the thin film. As a result, the thickness of the thin film can be obtained on the basis of the extreme value (wavelength $\lambda_C$).

(3) Third Type

When the thickness of the thin film is reduced even further, no extreme value can be seen and the energy of the light reflected by the sample varies monotonously with respect to its wavelength $\lambda$, as shown in FIG. 1C. In this case, the thickness of the thin film cannot be obtained by the aforementioned methods since there is no extreme value. However, for a certain wavelength, there is a correlation between the enery of reflected light and the thickness of the thin film. The correlation can be predetermined and used to determine the thickness of the thin film. For example, when the spectrum shown in FIG. 1C is detected, the energy $E_D$ of reflected light which has a wavelength $\lambda_D$ is measured to obtain the thickness of the thin film.

In recent years, a multilayered semiconductor device has been fabricated. There is a demand for accurate measurement of the thickness of the uppermost layer of such a device.

According to the aforementioned conventional film thickness measuring method, however, it is difficult to accurately measure the thickness of the uppermost layer as explained below.

FIG. 2A is a sectional view of a multilayered semiconductor device S. The device S includes a silicon substrate 40, a silicon oxide film 42, a polysilicon film 44 and a silicon oxide film 46. The silicon oxide film 46 is the uppermost layer of the device S.

When visible light I is applied to the multilayered semiconductor device S, light $R_1$ is reflected by the silicon oxide film 46, light $R_2$ is reflected by an interface between the silicon oxide film 46 and the polysilicon film 44, light $R_3$ is reflected by an interface between the polysilicon film 44 and the silicon oxide film 42 and light $R_4$ is reflected by an interface between the silicon oxide film 42 and the substrate 40.

When the thickness of the silicon oxide film 46 is measured by the aforementioned interferometry technique, the information required for such measurement is the reflected light $R_1$ and the reflected light $R_2$. The reflected light $R_3$ and the reflected light $R_4$ are disturbance noises. That is, the reflected light $R_3$ and the reflected light $R_4$ reduce the accuracy of measurement. Therefore, it is necessary to eliminate the influence of the reflected light $R_3$ and $R_4$ to accurately obtain the thickness of the silicon oxide film 46.

However, the intensity of the reflected light $R_3$ and $R_4$ is not constant since the surface of the polysilicon film 44 and optical constants thereof (such as index of refraction, absorptivity, etc.) vary according to the method and conditions of manufacturing the polysilicon film 44. Hence, it is difficult to selectively remove only the noise components caused by the reflected light $R_3$ and $R_4$. Thus, it has been generally difficult to accurately measure the thickness of a thin film which is the uppermost layer of a multilayered semiconductor device.

SUMMARY OF THE INVENTION

The present invention is directed to a method of and an apparatus for measuring the thickness of a thin film which is the uppermost layer of a sample having two or more stacked thin films.

A principal object of the present invention is to provide a film thickness measuring method and apparatus for measuring the thickness of a thin film which is an uppermost layer of a multilayered sample.

These and other objects, features, aspects and advantages of the present invention will become more apparent from the following detailed description of the present invention when taken in conjunction with the accompanying drawings.

DESCRIPTION OF THE PREFERRED EMBODIMENTS

A. Outline

Figure 3:
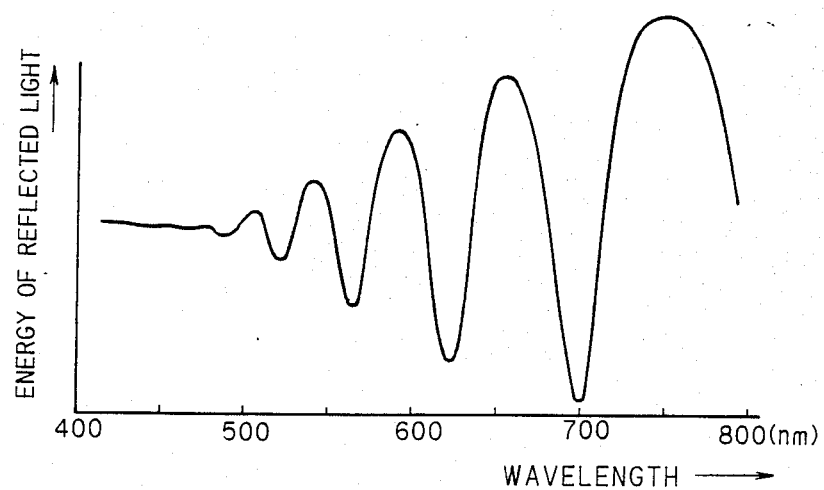
FIG. 3 illustrates a principle of the present invention.
Figure 4:
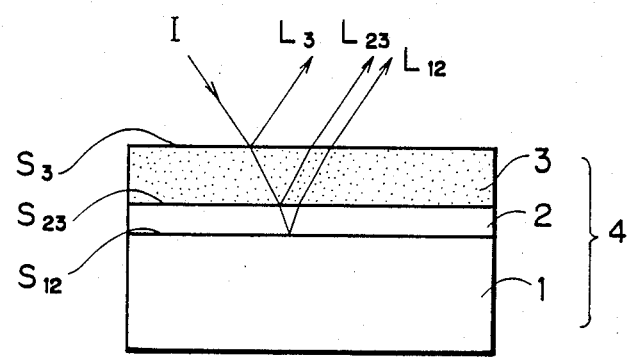
FIG. 4 illustrates another example of a multilayered sample.

FIG. 3 illustrates a wave form which represents the spectrum of light which is reflected by a semiconductor device 4 shown in FIG. 4 when the device 4 is irradiated with light I with a wavelength range of 400 nm to 800 nm. The semiconductor device 4 includes a silicon substrate 1, a silicon oxide film 2 (100 nm thick) formed on the silicon substrate 1 and a polysilicon film 3 (530 nm thick) formed on the silicon oxide film 2.

The amplitude of the waveform illustrated in FIG. 3 is reduced as the wavelength of the irradiating light is shortened. The amplitude is substantially zero in a wavelength range shorter than about 460 nm, i.e., in the ultraviolet region. The following conclusion can be drawn from this: In the visual region, the waveform has a relatively large amplitude since light $L_3$ reflected by a surface $S_3$ of the polysilicon film 3 interferes with light $L_{23}$ reflected by an interface $S_{23}$ between the silicon oxide film 2 and the polysilicon film 3 and ligh $L_{12}$ reflected by an interface S12 between the silicon substrate 1 and the silicon oxide film 2. In the ultraviolet region, on the other hand, substantially no light is reflected by the interface $S_{12}$ and $S_{23}$ since the polysilicon film 3 absorbs ultraviolet light. Therefore, the light $L_3$ reflected by the surface of the polysilicon film 3 is not for the most part subjected to interference, and hence the corresponding portion of the waveform has substantially no amplitude. It has been verified through various experiments that the longest wavelength at which the amplitude of the waveform is substantially zero is greater than 460 nm when the thickness of the polisilicon film 3 is in excess of 530 nm.

Thus, when a thin film to be measured is formed on a film which absorbs ultraviolet light (such as the polysilicon film 3), the thickness of the thin film can be obtained substantially without influence by the lower film when ultraviolet light is used for the film thickness measurement. Of course, the thin film to be measured must transmit ultraviolet light.

Figure 2A:
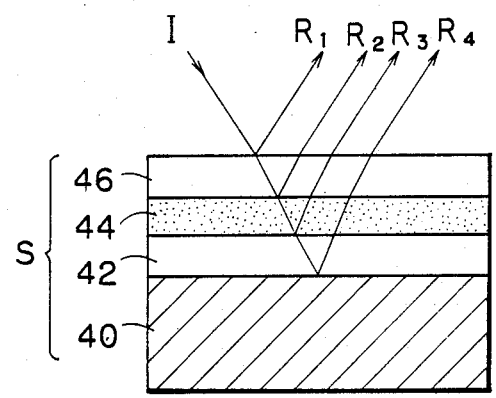
FIGS. 2A and 2B illustrate examples of multilayered semiconductor devices.
Figure 5:
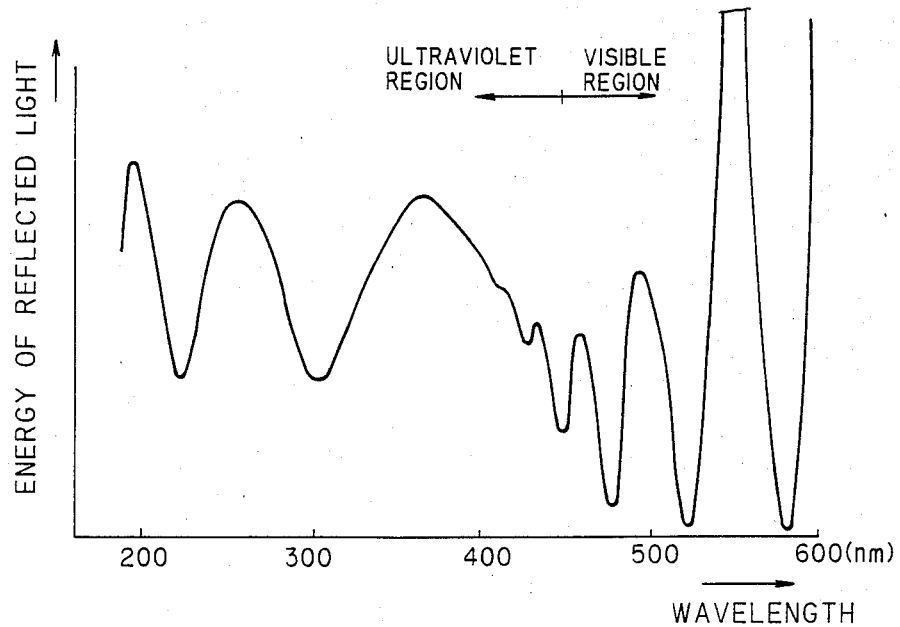
FIG. 5 illustrates spectral data which is detected when light of 200 nm to 600 nm is applied to the semiconductor device shown in FIG. 2A.

FIG. 5 illustrates a waveform which represents the spectrum of light reflected by the semiconductor device S shown in FIG. 2A when the device S is irradiated with light I with a wavelength range of 200 nm to 600 nm. The device S includes a silicon substrate 40, a silicon oxide film 42 (100 nm thick), a polysilicon film 44 (400 nm thick) and a silicon oxide film 46 (250 nm thick). The waveform illustrated in FIG. 5 is complicated in the visible region. This is because the polysilicon film 44 does not absorb light in the visible region. The visible light components advance not only through the silicon oxide film 46 but also through the polysilicon film 44 and the silicon oxide film 42. As a result, the visible light is reflected from the surface of the silicon oxide film 46 as the light $R_3$ and the light $R_4$ (FIG. 2A). The waveform is complicated due to the influence of the reflected light components $R_3$ and $R_4$.

Figure 2B:
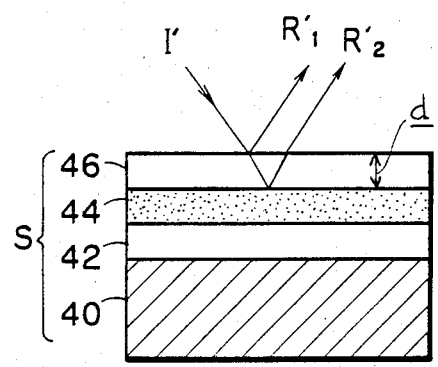

In the ultraviolet region, on the other hand, the waveform is relatively simple. This is because the polysilicon film 44 absorbs almost all of the ultraviolet light components. When an ultraviolet light component I' is incident upon a semiconductor device S as shown in FIG. 2B, only light $R_2'$ reflected by an interface between a silicon oxide film 46 and a polysilicon film 44 is guided toward the surface of the silicon oxide film 46. The light is absorbed in the polysilicon film 44. In the ultraviolet region, therefore, the waveform is simplified since it is determined only by inteference between light $R_1'$ reflected by the silicon oxide film 46 and the light $R_2'$.

Thus, it is not easy to analyze the spectrum of reflected visible light (wavelengths longer than about 460 nm) since the components $R_1$ to $R_4$ interfere with each other. However, a readily analyzable spectrum can be obtained with ultraviolet light (wavelengths shorter than 460 nm). With such ultraviolet light, there is no multiple interference. Therefore, the thickness of the uppermost layer (the silicon oxide film 46) of the multilayered semiconductor device S can be accurately measured by utilizing ultraviolet light. The materials of the thin films and the wavelengths of the employed light are not restricted to the particular materials and wavelengths described above. In other words, light of a specific wavelength range which can permeate the uppermost layer but not a layer located directly under the uppermost layer may be used to measure the spectrum of light reflected by a multilayered sample to obtain the thickness of the sample's uppermost layer.

B. Embodiment

Figure 6:
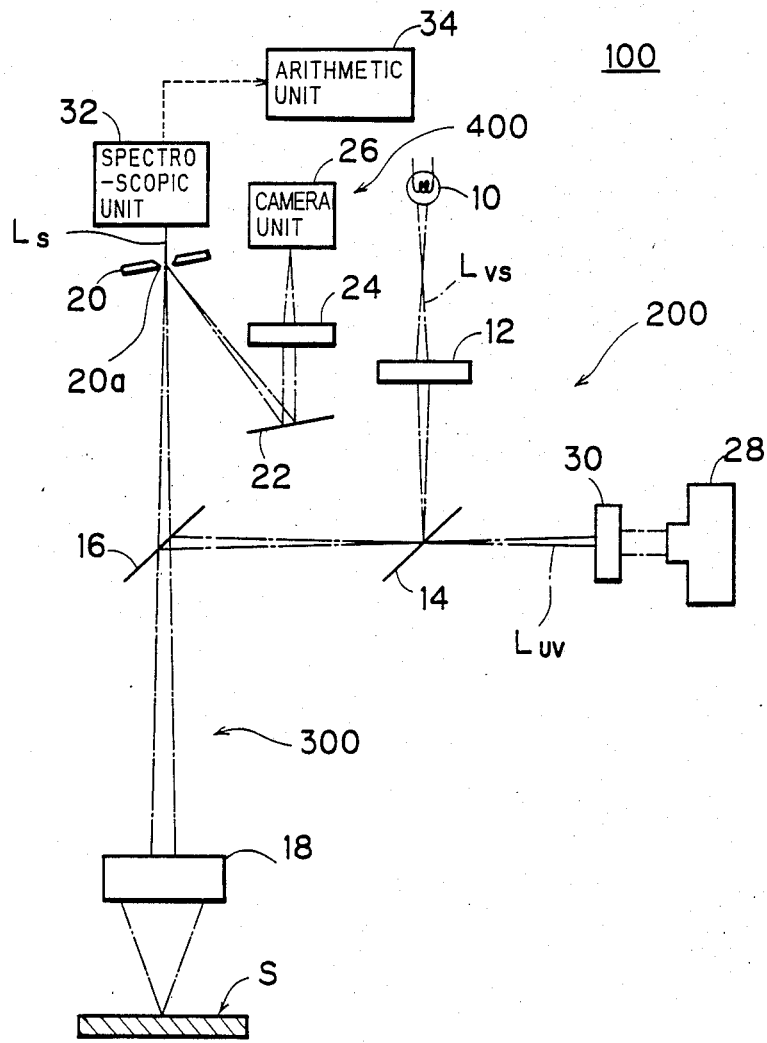
FIG. 6 is a block diagram of a film thickness measuring apparatus.

As shown in FIG. 6, a film thickness measuring apparatus 100 is formed by an illumination optical system 200, a microscope optical system 300, a reflecting mirror 20, a spectroscopic unit 32, a monitoring optical system 400, an arithmetic unit 34 and a control part (not shown).

The illumination optical system 200 comprises a light source 10 (such as a halogen lamp emitting visible light), a lens 12 and a shutter mirror 14. The mirror 14 can reciprocate in a direction perpendicular to the plane of the figure. Visible light $L_{VS}$ from the light source 10 is guided toward the microscopic optical system 300 through the lens 12 and the shutter mirror 14. The illumination optical system 200 also comprises another light source 28 for emitting ultraviolet light and another lens 30. The lens 30 is capable of guiding ultraviolet light $L_{UV}$ toward the miscroscopic optical system 300 in place of the visible light $L_{VS}$ The light source 28 may be formed by a member which emits light of a specific ultraviolet region, such as a deuterium lamp, a mercury lamp, an ultraviolet laser irradiator or a xenon lamp.

The microscopic optical system 300 is formed by a half mirror 16 and a mirror type image formation element 18.

When the shutter mirror 14 is on an optical axis as shown in FIG. 6, the visible light $L_{VS}$ from the light source 10 is applied (through the lens 12, the shutter 14, the half mirror 16 and the mirror type image formation element 18) to the surface of a sample S having a thin film (not shown) to be measured. When the shutter mirror 14 is evacuated from the optical axis, the ultraviolet light $L_{UV}$ from the light source 28 is applied to the surface of the sample S through the lens 30, the half mirror 16 and the mirror type image formation element 18.

A beam reflected by the surface of the sample S is magnified and imaged at a position close to the reflecting mirror 20 through the image formation element 18 and the half mirror 16.

The reflecting mirror 20 is provided with a pinhole 20a. Reflected light $L_S$ which passes through the pinhole 20a enters the spectroscopic unit 32.

The spectroscopic unit 32 is formed by a diffraction grating (not shown) for separating the reflected light $L_S$ into its spectral components and a light detector (not shown) for detecting the spectrum from the diffraction grating. Therefore, the spectrum of the light $L_S$ incorporated in the spectroscopic unit 32 is detected by the spectroscopic unit 32, and a signal corresponding to the spectrum of the light $L_S$ is supplied to the arithmetic unit 34 from the spectroscopic unit 32. The arithmetic unit 34 has a memory (not shown), and is structured to calculate the thickness of the thin film to be measured on the basis of the signal from the spectroscopic unit 32 and data stored in the memory.

Within the reflected beam, on the other hand, light reflected by the reflecting mirror 20 is incident upon the monitoring optical system 400, and imaged in a camera unit 26 through the mirror 22 and the image formation lens 24. Thus, an enlarged image of the surface of the measurement sample S is picked up by the camera unit 26 and projected on a CRT (not shown). Therefore, confirmation of the measuring position of the measurement sample S and focusing thereof can be performed on the basis of this enlarged image.

The entire apparatus 100 is controlled by signals from the control part (not shown). The light source 10, the lens 12 and the shutter mirror 14 are not requisite elements of the present invention. The surface of the sample can be observed by ultraviolet light.

Figure 7:
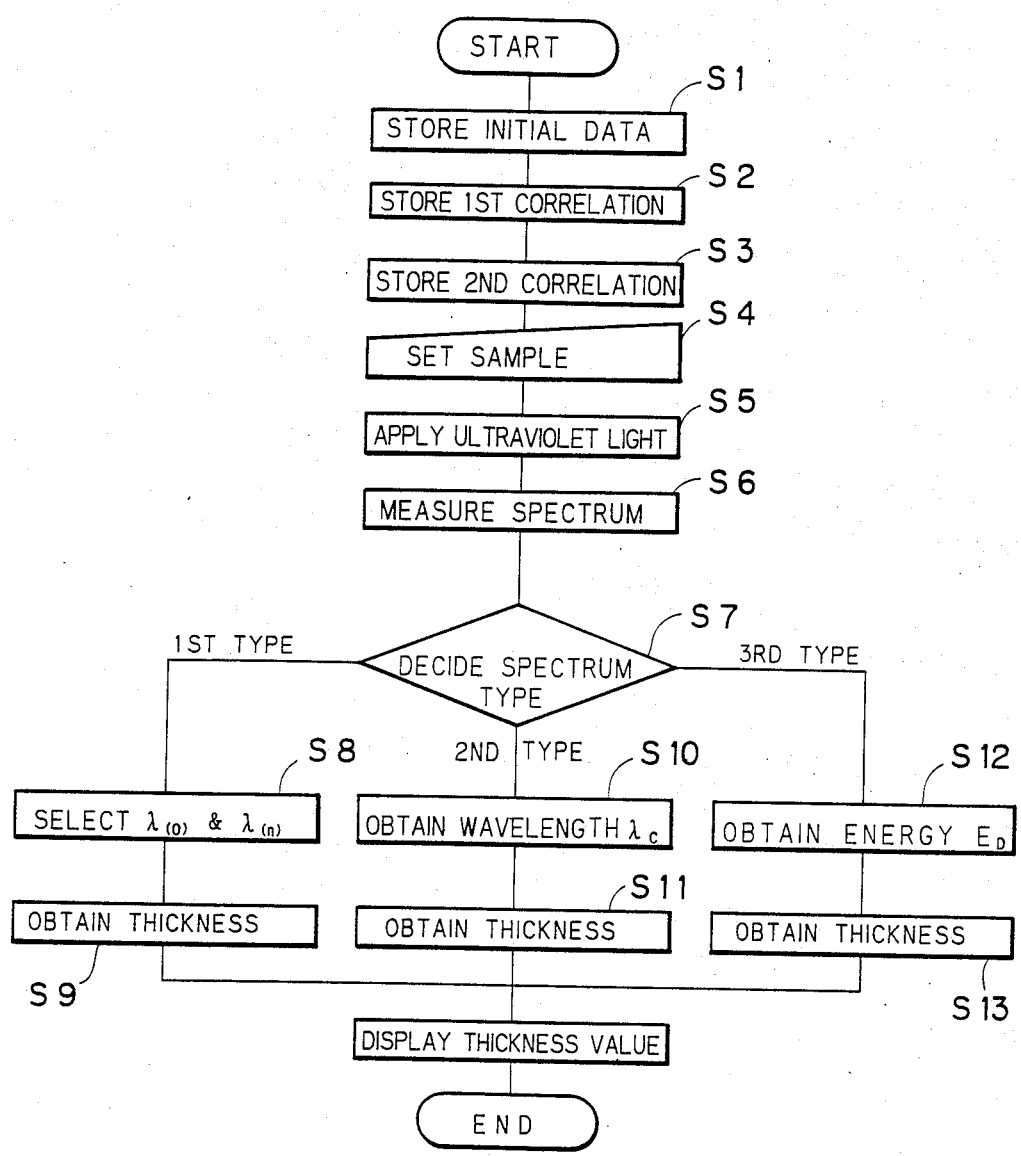
FIG. 7 is a flow chart showing a method of measuring film thickness by using the apparatus shown in FIG. 6.

FIG. 7 is a flow chart of the procedure of measuring film thickness by the film thickness measuring apparatus 100. It is assumed here that the semiconductor device S shown in FIG. 2A is the target of measurement.

In advance of film thickness measurement, an operator enters optical constants (such as the indices of refraction and absorption coefficients of the silicon oxide films 42 and 46, the polysilicon film 44 and the silicon substrate 40) through a keyboard (not shown). Entered initial data are stored in the memory of the arithmetic unit 34 (step S1). Within the arithmetic unit 34, correlation (hereinafter referred to as "first correlation") between the thickness d of the silicon oxide film 46 and an extreme value $\lambda_C$ (FIG. 1B) of the spectrum is obtained from the data by arithmetic processing, and stored in the memory (step S2). Further, correlation (hereinafter referred to as "second correlation") between the thickness d and the energy of reflected light at a specific wavelength $\lambda_D$ (FIG. 1C) is obtained from the data and stored in the memory (step S3).

The operator then sets the semiconductor device S, which has a silicon oxide film 46 to be measured, in a prescribed position as shown in FIG. 6 (step S4). At this time, the light source 10 is turned on (in accordance with a command from the operator) and an image of the surface of the semiconductor device S is picked up by the camera unit 26 and projected on the CRT. The operator can confirm the position of the semiconductor device S and focus the same on the basis of the image projected on the CRT, to thereby correctly specify the measuring position.

Thereafter, the operator supplies a measurement start command to the control part to execute steps S5 to S14 in response to commands from the control part. The light source 28 is turned on and the shutter mirror 14 is evacuated from the optical axis of the ultraviolet light $L_{UV}$, so that the ultraviolet light $L_{UV}$ from the light source 28 is applied to the surface of the semiconductor device S (step S5).

The ultraviolet light $L_{UV}$ applied to the surface of the semiconductor device S is reflected by the surface of the semiconductor device S, and the spectrum of the reflected light $L_S$ is measured by the spectroscopic unit 32 (step S6). Thereafter, a decision is made (step S7) as to which one of the aforementioned three types the spectrum belongs to. The thickness of the silicon oxide film 46 is obtained in the following manner, in response to the type of the spectrum.

(1) First Type

Figure 1A:
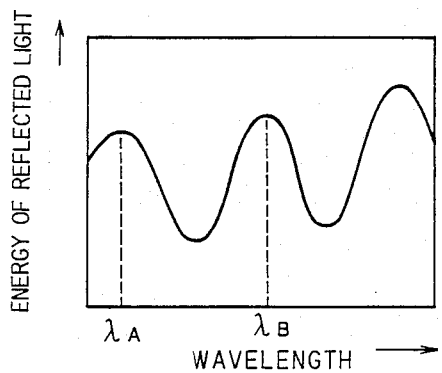
FIGS. 1A to 1C illustrate typical patterns of spectra.

When it is decided (step S7) that the spectrum measured by the spectroscopic unit 32 is of the type shown in FIG. 1A, an arbitrary extreme value (wavelength $\lambda_{(0)}$) and an n-th extreme value (wavelength $\lambda_{(n)}$) (n: arbitrary integer exceeding 1) are obtained from the spectrum shown in FIG. 1A (step S8). A refraction index $N_{(0)}$ of the silicon oxide film 46 at the wavelength $\lambda_{(0)}$ and a refraction index of the silicon oxide film 46 at the wavelength $\lambda_{(n)}$ are read from the memory of the arithmetic unit 34 to obtain the thickness d on the basis of the following expression.

$$d = \frac{n}{4} \cdot \frac{1}{\frac{N_{(0)}}{\lambda_{(0)}} - \frac{N_{(n)}}{\lambda_{(n)}}} \tag{1}$$

When the reflectance of the polysilicon film 44 varies in the ultraviolet region, read errors may be caused with respect to the extreme values. This may reduce measurement accuracy. To prevent such errors, the extreme values may be read while avoiding a wavelength range in which the reflectance of the polycilicon film 44 is variable.

(2) Second Type

Figure 1B:
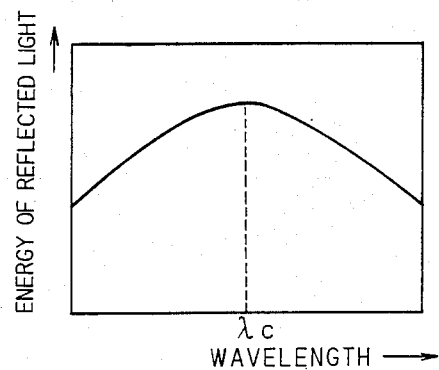

When the ultraviolet spectrum measured by the spectroscopic unit 32 is of the type shown in FIG. 1B, a wavelength $\lambda_C$ of its extreme value is obtained (step S10) and thereafter the thickness d of the silicon oxide film 46 is obtained from the first correlation stored in the memory of the arithmetic unit 34 and the wavelength $\lambda_C$ (step S11).

(3) Third TYpe

Figure 1C:
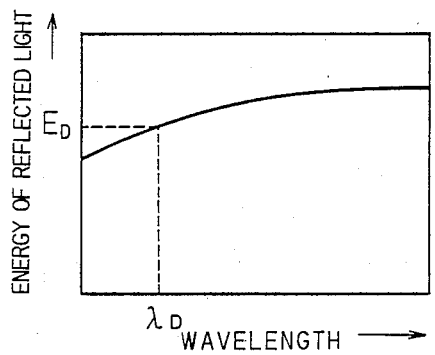

When the ultraviolet spectrum measured by the spectroscopic unit 32 is of the type shown in FIG. 1C, the engergy $E_D$ of reflected light $L_S$ at a specific wavelength $\lambda_D$ is obtained S12. The thickness d of the silicon oxide film 46 is then obtained from the second correlation stored in the memory of the arithmetic unit 34 and the energy $E_D$ (step S13).

Finally, the thickness d of the silicon oxide film 46 is displayed on a display unit (not shown) (step S14).

The ultraviolet light $L_{UV}$ is applied to the surface of the semiconductor device S to measure the spectrum of the light $L_S$ reflected by the surface of the semiconductor device S. The spectrum is influenced only by the light reflected by the silicon oxide film 46 and the light reflected by the interface between the silicon oxide film 46 and the polysilicon film 44. Thus, the thickness of the silicon oxide film 46 can be correctly obtained from the spectrum measured by the spectroscopic unit 32.

The method for obtaining the thickness of the silicon oxide film 46 from the measured spectrum is not restricted to the above but can be carried out in various modifications.

Although the first correlation is obtained by arithmetic processing on the basis of the optical constants of the semiconductor device S, etc., the first correlation may be obtained by applying ultraviolet light to a sample whose thickness is already known and thereafter measuring an extreme value (wavelength $\lambda_C$) of ultraviolet reflected light. Similarly, the second correlation may be obtained by applying ultraviolet light to a sample whose thickness is already known and thereafter measuring the energy of ultraviolet reflected light at a specific wavelength $\lambda_D$.

The present invention can be used to measure the thickness of an uppermost layer of a sample other than the semiconductor device S.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A method of determining the thickness of a layer, the method comprising:
   providing a sample which includes (1) a substrate, (2) a first layer, the first layer being the uppermost layer of the sample and (3) a second layer, the second layer being located between the first layer and the substrate, the second layer being located directly under the first layer;
   irradiating the sample such that a first component of light is reflected by a first surface of the first layer, such that second and third components of the light are transmitted through the first layer, such that the second component is reflected at an interface between the first layer and the second layer of the sample and such that the third component is absorbed by the second layer;
   detecting the spectrum of the reflected components; and
   using the spectrum to determine the thickness of the first layer.

2. The method of claim 1, wherein the first layer is a thin film.

3. The method of claim 12, wherein the second layer is a thin film.

4. The method of claim 3, wherein the sample is a semiconductor device, the first layer being formed of silicon oxide, the second layer being formed of polysilicon, the substrate being formed of silicon.

5. The method of claim 4, wherein the step of irradiating the sample includes irradiating the sample with ultraviolet light.

6. The method of claim 5, wherein the sample includes a third layer, the third layer being located between the second layer and the substrate, the third layer being formed of silicon oxide.

7. The method of claim 1, further comprising:
   obtaining correlation data representative of the character of light reflected by the sample and the thickness of the first layer; and
   using the correlation data to determine the thickness of the first layer.

8. The method of claim 7, wherein the step of obtaining the correlation data includes:
   storing optical constants of the first layer in a memory; and
   subsequently, arithmetically processing the optical constants.

9. The method of claim 8, wherein the optical constants include an index of refraction and an absorption coefficient.

10. The method of claim 7, wherein the correlation data is representative of a correlation between an extreme value of the spectrum and the thickness of the first layer.

11. The method of claim 7, wherein the correlation data is representative of a correlation between the energy of light reflected by the sample and the thickness of the first layer.

12. An apparatus for determining the thickness of a layer, the apparatus comprising:
    means for irradiating a sample such that a first component of light is reflected by a first surface of an uppermost layer of the sample, such that second and third components of the light are transmitted through the uppermost layer, such that the second component is reflected at an interface between the uppermost layer and a second layer of the sample which is located directly under the uppermost layer and which is located between the uppermost layer and a substrate of the sample and such that the third component is absorbed by the second layer;
    means for detecting the spectrum of the reflected components; and
    means for using the spectrum to determine the thickness of the uppermost layer.

13. The apparatus of claim 12, wherein the irradiating means includes a lamp for generating ultraviolet light.

14. The apparatus of claim 13, wherein the lamp is a deuterium lamp.

15. The apparatus of claim 13, wherein the lamp is a xenon lamp.

* * * * *

UNITED STATES PATENT AND TRADEMARK OFFICE
CERTIFICATE OF CORRECTION

PATENT NO. : 4,984,894
DATED : January 15, 1991
INVENTOR(S) : Noriyuki Kondo

It is certified that error appears in the above-identified patent and that said Letters Patent is hereby corrected as shown below:

Column 7:
In Claim 3, line 1, change "12" to --2--.

Signed and Sealed this

Twenty-ninth Day of June, 1993

Attest:

MICHAEL K. KIRK

*Attesting Officer*   Acting Commissioner of Patents and Trademarks